United States Patent [19]

Maddox et al.

[11] Patent Number: 4,502,839

[45] Date of Patent: Mar. 5, 1985

[54] VIBRATION DAMPING OF ROTOR CARRYING LIQUID RING

[75] Inventors: James P. Maddox, Sherman Oaks; Jack Jolley, Jr., Venice; Louis W. Drobnick, Santa Monica; William E. Amend, Rolling Hills Estates, all of Calif.

[73] Assignee: Transamerica Delaval Inc., Lawrenceville, N.J.

[21] Appl. No.: 438,477

[22] Filed: Nov. 2, 1982

[51] Int. Cl.³ .................................... G01K 25/06
[52] U.S. Cl. ............................ 415/202; 415/90
[58] Field of Search .............. 415/202, 90, 76, 80, 415/81, 91

[56] References Cited

U.S. PATENT DOCUMENTS

| | | | |
|---|---|---|---|
| 2,060,414 | 11/1936 | Fladeland | 415/80 |
| 3,032,988 | 5/1972 | Kleckner | 60/39.35 |
| 3,758,223 | 9/1973 | Eskeli | 415/1 |
| 3,930,744 | 1/1976 | Theis, Jr. | 415/202 |
| 3,995,428 | 12/1976 | Roberts | 60/641 |
| 4,063,417 | 12/1977 | Shields | 60/641 |
| 4,087,261 | 5/1978 | Hays | 55/41 |
| 4,141,219 | 2/1979 | Elliot | 60/645 |
| 4,227,373 | 10/1980 | Amend et al. | 415/121 A |
| 4,258,551 | 3/1981 | Ritzi | 60/654 |
| 4,298,311 | 11/1981 | Ritzi | 415/80 |
| 4,336,693 | 6/1982 | Hays et al. | 62/116 |
| 4,339,923 | 7/1982 | Hays et al. | 415/88 |
| 4,411,135 | 10/1983 | Striebich | 415/90 |

FOREIGN PATENT DOCUMENTS

| | | | |
|---|---|---|---|
| 32847 | 9/1885 | Austria | 415/202 |
| 62274 | 3/1923 | Sweden | 415/202 |

*Primary Examiner*—John W. Shepperd
*Assistant Examiner*—Renee S. Kidorf
*Attorney, Agent, or Firm*—William W. Haefliger

[57] ABSTRACT

A matrix in a rotating rotor prevents or inhibits formation of waves in a liquid ring. The matrix may be located in first and/or second channel sections defined by the rotor, liquid passing from the first to the second channel section; and a turbine may have a scoop removing liquid from the second section, proximate ends of barriers defined by the matrix.

The matrix includes grooves between the barriers to communicate liquid generally parallel to an axis defined by the rotor. The grooves have end openings and may be closed in a direction toward that axis.

17 Claims, 10 Drawing Figures

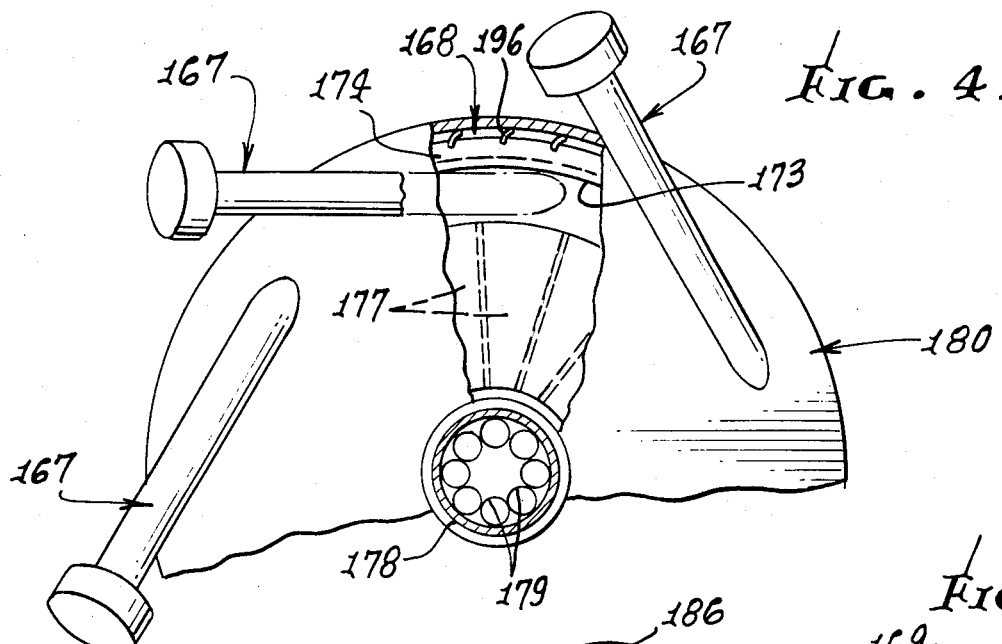
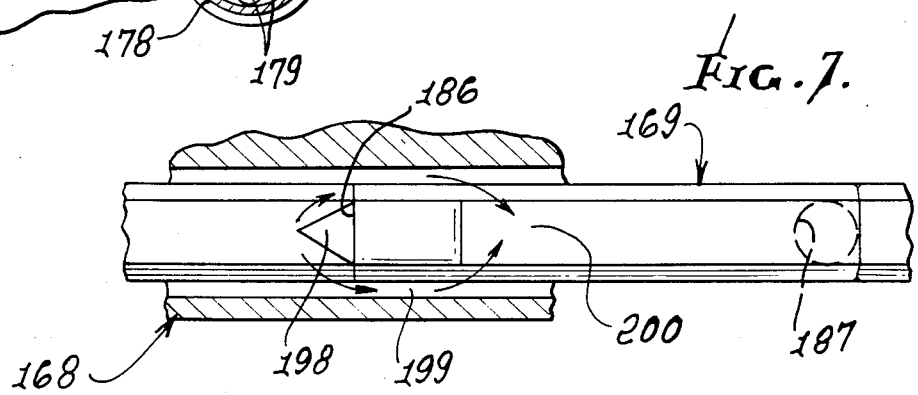
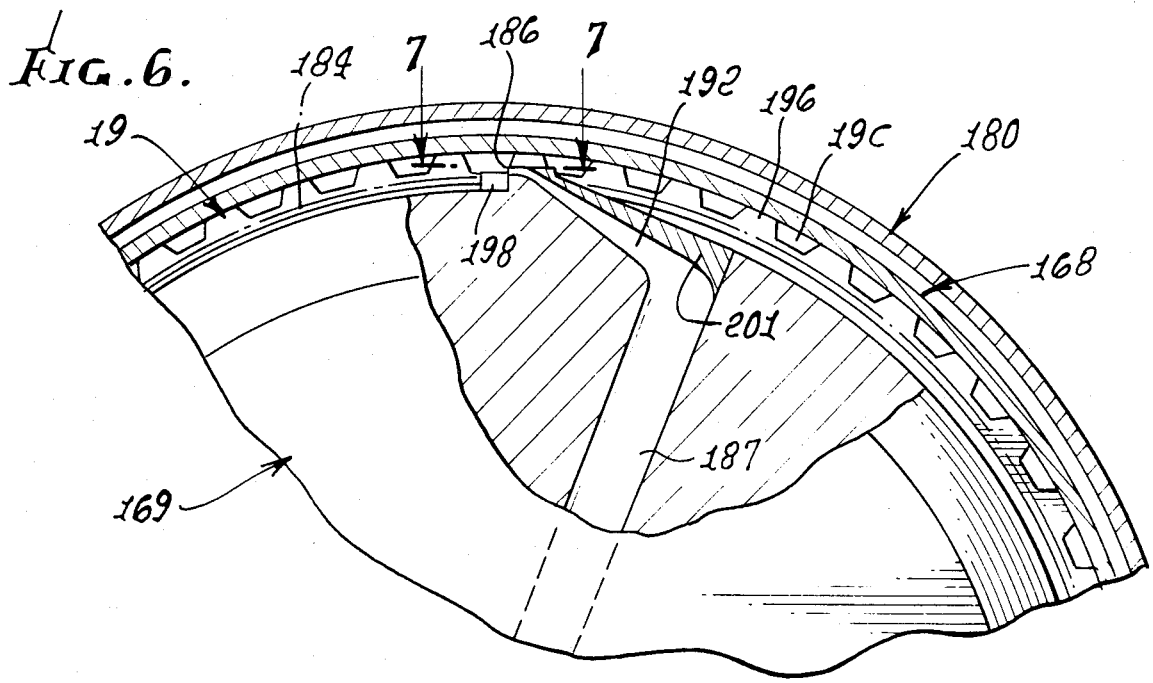

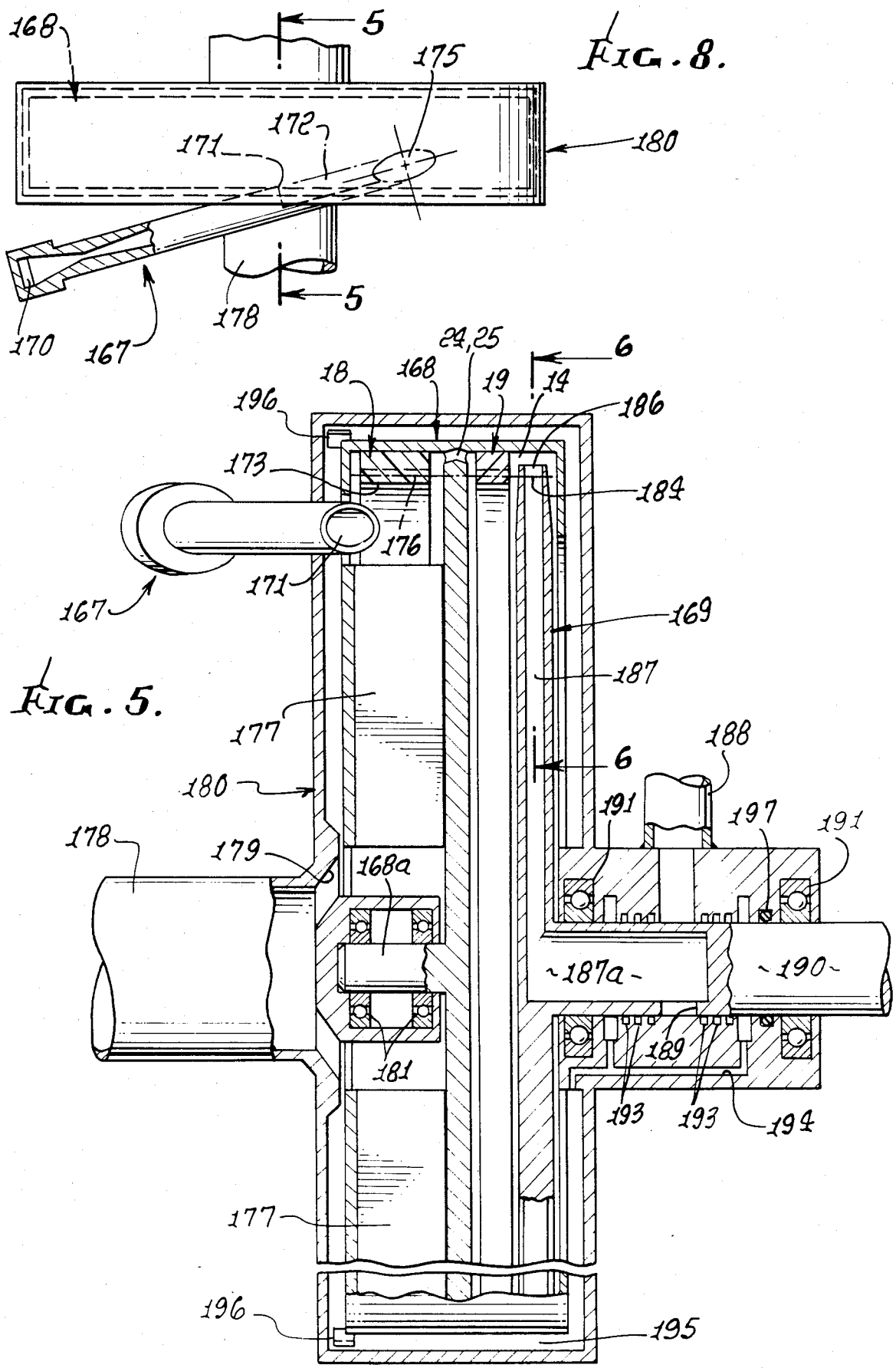

VIBRATION DAMPING OF ROTOR CARRYING LIQUID RING

BACKGROUND OF THE INVENTION

This invention relates generally to damping and controlling vibration of rotors, and more particularly concerns such damping and controlling of vibration of rotors which carry rotating rings of liquid.

The dynamic stability of rotors partially filled with viscous incompressible fluids is critical to successful operation of many types of devices employing such rotors. Examples are centrifuges, liquid cooled machinery, spinning ordnance projectiles and two-phase turbines, there being many others. Theoretical studies in which the equations characterizing rotor dynamics are coupled with equations of motion for rotating fluids have identified specific regimes of stable and unstable motion. Among important factors are angular frequency, rotor and housing stiffness and damping, and fluid properties. Unstable modes are caused by waves in the liquid which, if not damped or suppressed, can result in catastrophic failure of the machine. This phenomena has been encountered in rotary separators and turbines of the type described herein, and characterized by a rotating ring of liquid. Flow field observations have identified a liquid wave tending to surge and rotate relative to the liquid channel at frequencies typically in the range 85% to 95% of rotor speed.

SUMMARY OF THE INVENTION

It is a major object of the invention to provide method and apparatus for controlling or eliminating the vibrations in rotating rotors resulting from hydraulic instabilities. Basically, the method includes the prevention of formation of waves in liquid rings in rotating rotors, and the provision of inserts that damp and absorb wave energy. As will be seen, the invention is characterized by the provision of a matrix in a liquid ring containing channel, the matrix sized and located to trap the liquid within transverse grooves or passages of short length, isolating the liquid ring free surface from windage shear.

It is a further object of the invention to provide such a matrix or matrices in a rotor having axially spaced liquid separation and turbine channels, with provision for flow between such channels and within the matrix tubes in the channel, as will be seen.

It is a further object of the invention to provide a matrix or matrices as described in the form of grooves formed by cogs of a belt or belts, or in the form of metallic tubes of rectangular cross section, or in other forms as will be seen.

These and other objects and advantages of the invention, as well as the details of illustrative embodiments, will be more fully understood from the following description and drawings, in which:

DRAWING DESCRIPTION

FIG. 4 is a side elevation of a nozzle, separator and turbine combination;

FIG. 5 is an enlarged sectional elevation taken on lines 5—5 of FIG. 8;

FIG. 6 is a fragmentary section on lines 6—6 of FIG. 5;

FIG. 7 is an enlarged section on lines 7—7 of FIG. 6;

FIG. 8 is a top plan view, partly in section, of the FIG. 4 combination; and

DETAILED DESCRIPTION

Figure 1:
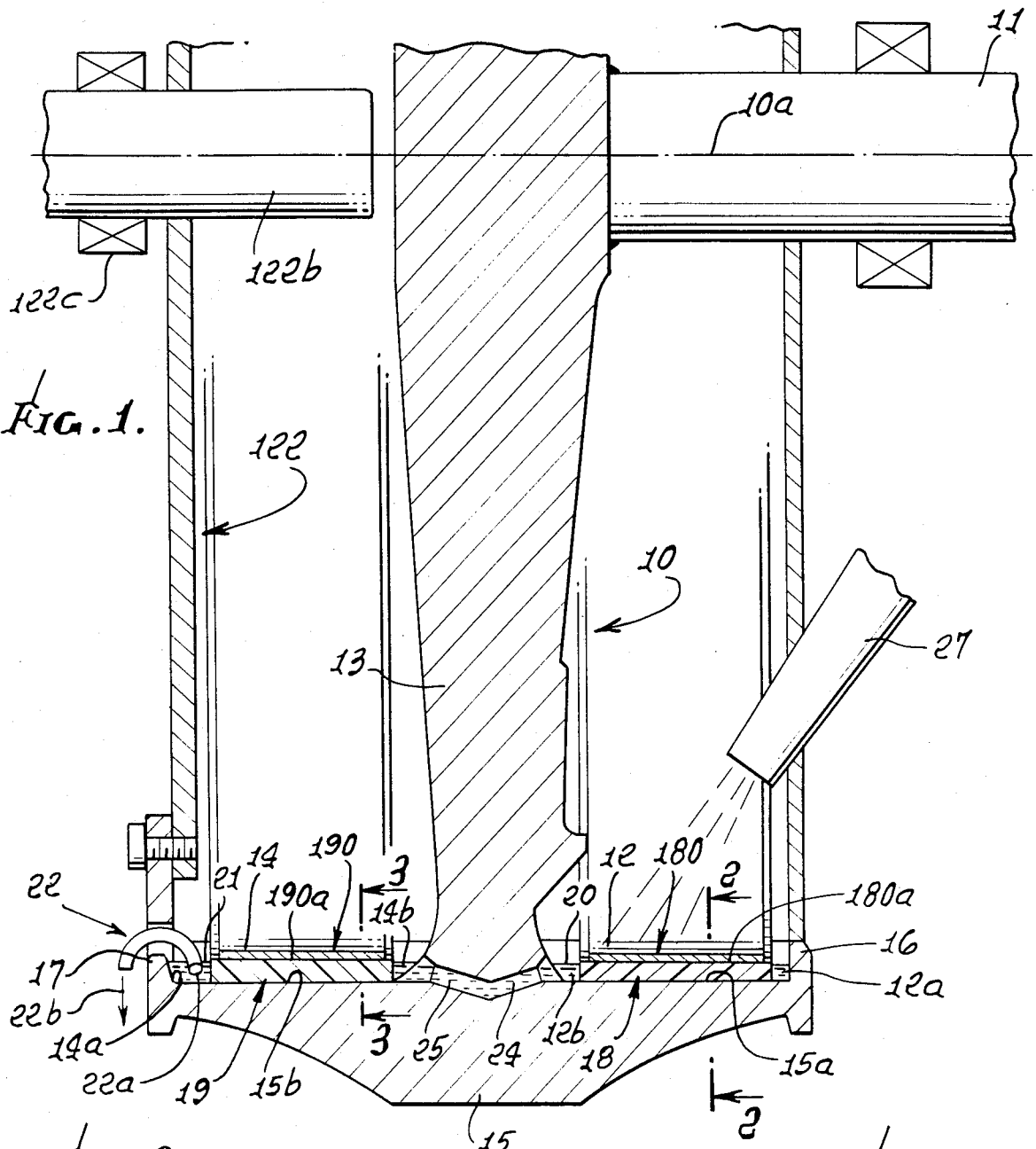
FIG. 1 is enlarged cross section through a rotor incorporating the invention.
Figure 3:
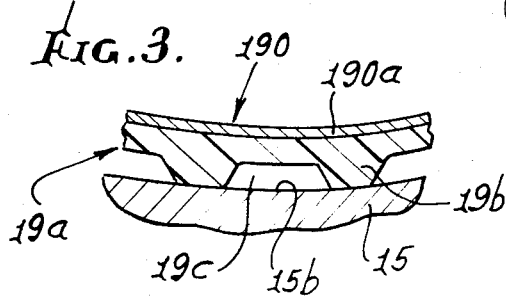
FIG. 3 is an enlarged section on lines 3—3 of FIG. 1.
Figure 2:
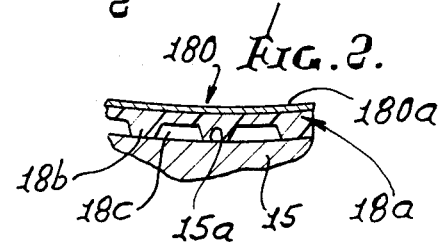
FIG. 2 is an enlarged section on lines 2—2 of FIG. 1.

In FIG. 1, a rotor 10 is rotatable about an axis 10a, as on an axle indicated at 11. The rotor defines a first annular channel 12 at one side of rotor disc 13, and a second annular channel 14 at the opposite side of disc 13. A rotor peripheral flange 15 is integral with disc 13, and projects axially to define the two channels. Annular lips or rings 16 and 17 extend radially inward from flange 15, at the outer sides of the channels, to retain liquid therein.

Located in the respective channels 12 and 14 are annular matrices, indicated generally at 18 and 19, for trapping liquid in each matrix. In this regard, liquid is maintained in each channel as by centrifugal force due to rotor rotation. It is found that such liquid entrapment, in the recesses or interstices of the matrices, inhibits surge wave development that otherwise is productive of rotor vibration during rotor and liquid rotation. The liquid typically is below the top surfaces of the matrices, the liquid surfaces indicated at 20 and 21, and the top annular surface 180a of the matrix 18 defined by a thin annular cover 180 which may be metallic. Similarly, the top annular surface 190a of matrix 19 is defined by a thin annular cover 190, typically metallic. The inner inlet 22a of a scoop 22 penetrates liquid in sub-channel 14a for removing liquid from that sub-channel accompanied by torque development transferred to turbine wheel 122 for rotating and driving the turbine, as will be later described in connection with FIG. 5. Turbine 122 rotates on its own axle or suspension 122b, bearing supported at 122c, and the scoop liquid discharges at 22b.

Liquid is continually supplied to channel 14, from channel 12, as via generally axial passages 24 and 25 through the disc 13, as shown. Liquid is supplied to channel 12 as from a nozzle 27, the jet from the nozzle impinging on the matrix 18 and driving the rotor. The nozzle is angled in the direction of rotor rotation, so that the jet drives the rotor, as described for example in U.S. Pat. No. 3,879,949.

Figure 3A:
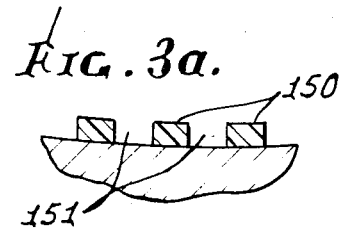
FIG. 3a is a view like FIG. 3, showing a modification.

In the described example, the matrix 18 has the form of an elastomeric belt 18a, with cogs 18b elongated in the direction of axis 10a, and spaced about that axis. Grooves 18c between the cogs trap or retain liquid therebetween. Belt 18a may be suitably bonded to the inner surface 15a of the flange as by epoxy adhesive. Note open annular sub-channels 12a and 12b at opposite ends of the cogs and grooves to allow liquid to flow between the grooves for maintenance of the same levels, and to feed to passages 24 and 25. Multiple pairs of passages 24 and 25 are typically located about the axis 10. In similar manner, matrix 19 has the form of an elastomeric belt 19a, with cogs 19b elongated in the direction of axis 10a, and spaced about that axis (both belts 19a and 18a extend annularly in their respective channels). Grooves 19c between the cogs trap or retain liquid therebetween. Belt 19a may be bonded to the inner surface 15b of flange 15, at the cog location. The open annular sub-channels 14a and 14b at opposite ends of the cogs and grooves to permit flow of liquid between the grooves, for self-adjusting maintenance of the same level, and to feed from passages 24 and 25. Cogs 18b are like one another, and cogs 19b are like one another. In the above, the cogs may be considered as one form of barriers spaced about the rotor axis and extending generally parallel to that axis. Alternatively, dams may be provided at the cog location, with open grooves between the dams. See FIG. 3a with dams 150 and grooves 151.

The FIGS. 4-8 embodiment incorporates typical nozzles 167, separator wheel 168 rotating within a casing 180, and radial-flow turbine 169, shown as coaxially rotatable within the casing. A liquid and vapor or gas mixture is typically supplied at high pressure to the nozzle inlets 170. The mixture expands to low pressure at the nozzle exits 171. and the resulting high-velocity two-phase jets 172 impinge on the inner surface 173 of the matrix 18 on the rotating separator at locations 175, seen in FIG. 8. The liquid becomes concentrated in a layer 176 on and in the matrix due to the inertia of the liquid and to centrifugal force, while the gas or steam separates and flows radially inward through passages 177 and enters the discharge pipe 178 through ports 179 in the stationary casing or housing 180. The rotating separator is supported by bearings 181 mounted in the housing 180, and receiving a separator wheel axle 168a.

The rotation of the separator 168 is impeded only by windage and bearing friction losses which can be very small. Thus only a very small relative velocity between the impinging jet 172 and the surface 173, aided by the torque imparted to the rotating separator by the inward flow of the gas through passages 177, serves to maintain the speed of the liquid layer 176 at a value nearly equal to that of the jets 172.

The liquid flows from the liquid layer 176 through passages 24 and 25 in the rim of the rotating separator 168 and then into annular channel 14 which forms an integral part of the separator wheel 168. As a result another liquid layer 184 is formed, held in position by centrifugal force and by matrix 19. This layer furnishes the fluid energy source for the turbine rotor 169 rotating concentrically within the separator wheel and having turbine inlet passages 186 immersed in the liquid layer 184.

The turbine 169 may have blades or passages arranged to intercept the liquid layer 184, and FIGS. 5 and 6 show a radial-flow type turbine. The turbine rotor 169 typically rotates at a lower angular velocity than the separator wheel 168, causing liquid from the layer 184 to enter the inlets 186, flow radially inward through passages 187, and flow to liquid outlet pipe 188 via axial passage 187a in shaft 190 and apertures 189 in the wall of the turbine shaft 190. The shaft 190 is connected to the load to be driven. The turbine 169 is supported on bearing 191.

Each turbine passage 187 can optionally incorporate a diffuser 192 in which the velocity of the liquid entering inlet 186 can be partially converted to pressure such that, even allowing for the pressure drop in the radial passages 187 due to centrifugal force, the liquid pressure in discharge pipe 188 is substantially higher than the pressure in the turbine casing 180, and in fact, greater than the pressure at the nozzle inlets 170. Thus the diffusers 192 can supply any need for pumping of the liquid.

For operation with high pressure at the discharge 188, the leakage of liquid between the shaft 190 and the housing 180 is reduced by labyrinth seals 193 and drains 194 which return liquid leakage to the bottom 195 of the housing 180, where the liquid from this and other internal leakage sources is picked up by slinger blades 196 and thrown back into the jets 172. Leakage to the outside of housing 180 is prevented by a shaft seal 197.

The external shape of the turbine inlet ports 186 must be such as to minimize external drag and turbulence that could disturb and retard the liquid layer 184. The design shown in FIG. 7 employs a wedge-shaped strut 198 for the portion of the turbine inlet which intercepts the surface of the liquid layer 184 so that the flow intercepted by the strut is split at 199 with minimum disturbance and returned with little velocity loss to the liquid layer in the wake region 200 behind the turbine inlet 186.

To allow for operation at different liquid flow rates, the passage 192 may be equipped with moveable walls 201 which serve to vary the area of the turbine inlets 186.

Accordingly, the FIGS. 4-8 embodiment provides, essentially, a moving surface to enable separation of the gas and liquid phases with extremely low friction, said surface comprising a first freely rotatable wheel having a matrix toward which the jet is tangentially directed. Also, FIGS. 4-8 provide a second wheel having a periphery extending in proximity with the periphery of the first wheel whereby the two wheels define a gap therebetween to receive the separated first fluid and supply the fluid to the second wheel wherein the kinetic energy of the fluid is converted for example to shaft power and to pumping power.

Figure 9:
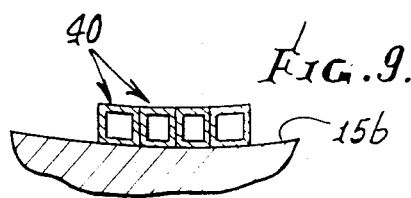
FIG. 9 is an end view of tubular ducts on a rotor channel.

Referring now to FIG. 9 the dams are shown in the form of metallic tubes 40, which have rectangular cross sections. The tubes extend in side by side relation, as shown in FIG. 9, wherein three are illustrated. The ends of the tubes open to sub-channels, as at 14a and 14b, described further in FIG. 1.

We claim:
1. Rotary apparatus comprising
 (a) a rotor having an axis and defining an annular channel to receive liquid that rotates with the rotor about the axis thereof,
 (b) a matrix in the channel for trapping the liquid in the matrix, thereby to inhibit surge wave development that otherwise is productive of rotor vibration during such rotor and liquid rotation,
 (c) the matrix including grooves to communicate fluid in a direction generally parallel to an axis defined by the rotor, the grooves having end openings and being closed in a direction toward said axis.

2. The apparatus of claim 1 wherein annular sub-channels are formed at opposite ends of the grooves (barriers), to communicate liquid to said grooves.

3. The apparatus of claim 1 wherein said matrix comprises barriers spaced about the rotor axis and extending generally parallel to said axis, the rotor having flange structure on which the barriers are supported.

4. The apparatus of claim 3 wherein said matrix comprises a cog belt having cogs defining said barriers.

5. The apparatus of claim 3 wherein said channel has a bottom surface to which the matrix is attached, the height of the matrix being more than liquid depth in the channel, as measured from said bottom surface.

6. The apparatus of claim 3 wherein said barriers comprise metallic bodies.

7. The apparatus of claim 6 wherein said bodies have generally rectangular cross sections.

8. The apparatus of claim 1 including a nozzle located to jet fluid including liquid toward the rotor channel for liquid collection therein.

9. The apparatus of claim 8 wherein said channel includes first and second sections which are axially spaced apart and intercommunicate, the nozzle directed at the first section, which collects liquid, and the second section having associated turbine structure receiving flow of liquid from the first section.

10. The apparatus of claim 9 wherein the rotor includes a body separating said channel sections, there being a passage through the body to intercommunicate said channel sections, the liquid in each channel section being below the top surface of a matrix therein.

11. The apparatus of claim 9 wherein said matrix includes a matrix section in each channel, the surfaces of the matrix sections closest to an axis of rotor rotation being at approximately the same radial distance from said axis.

12. The apparatus of claim 9 wherein said turbine structure is carried to rotate independently of the rotor and includes a scoop having an inlet in an annular sub-channel formed proximate certain ends of the barriers in the second channel section.

13. The apparatus of claim 9 wherein said matrix comprises a series of barriers spaced about the rotor axis in at least one of said channel sections, the barriers extending generally parallel to said axis, the rotor having flange structure on which the barriers are supported.

14. The apparatus of claim 13 wherein the barriers are arranged in first and second series respectively located in the first and second channel sections.

15. Rotary apparatus comprising
 (a) a rotor having an axis defining an annular channel to receive liquid that rotates with the rotor about the axis thereof,
 (b) a matrix in the channel for trapping the liquid in the matrix, thereby to inhibit surge wave development that otherwise is productive of rotor vibration during such rotor and liquid rotation,
 (c) said matrix comprising barriers spaced about the rotor axis and extending generally parallel to said axis,
 (d) and wherein an annular sub-channel is formed at corresponding ends of the barriers, to communicate liquid to grooves formed between the barriers,
 (e) said grooves communicating liquid in direction generally parallel to the rotor axis, the grooves having end openings at said sub-channel confined to rotate with said rotor.

16. Rotary apparatus comprising
 (a) a rotor having an axis and defining an annular channel to receive liquid that rotates with the rotor about the axis thereof,
 (b) a matrix in the channel for trapping the liquid in the matrix, thereby to inhibit surge wave development that otherwise is productive of rotor vibration during such rotor and liquid rotation,
 (c) a nozzle located to jet fluid including liquid toward the rotor channel for liquid collection therein,
 (d) said channel including first and second sections which are axially spaced apart and intercommunicate, the nozzle directed at the first section, which collects liquid, and the second section having associated turbine structure receiving flow of liquid from the first section,
 (e) said matrix comprising a series of barriers spaced about the rotor axis in at least one of said channel sections, the barriers extending generally parallel to said axis,
 (f) and wherein an annular sub-channel is formed at corresponding ends of the barriers, to communicate liquid to grooves formed between the barriers,
 (g) said grooves extending in parallel relation and communicating liquid in directions parallel to said rotor axis, the grooves having end openings at said sub-channel confined to rotate with said rotor.

17. Rotary apparatus comprising
 (a) a rotor having an axis and defining an annular channel to receive liquid that rotates with the rotor about the axis thereof,
 (b) a matrix in the channel for trapping the liquid in the matrix, thereby to inhibit surge wave development that otherwise is productive of rotor vibration during such rotor and liquid rotation,
 (c) a nozzle located to jet fluid including liquid toward the rotor channel for liquid collection thereof,
 (d) said channel including first and second sections which are axially spaced apart and intercommunicate, the nozzle directed at the first section, which collects liquid, and the second section having associated turbine structure receiving flow of liquid from the first section,
 (e) said matrix comprising a series of barriers spaced about the rotor axis in at least one of said channel sections, the barriers extending generally parallel to said axis,
 (f) the barriers being arranged in first and second series respectively located in the first and second channel sections,
 (g) and wherein annular sub-channels are formed at opposite ends of each of the first and second series barriers,
 (h) there being grooves formed between the barriers to extend in generally parallel relation and communicating liquid in directions parallel to said rotor axis, the grooves having end openings at said sub-channels which are confined by the rotor to rotate with the rotor.

* * * * *